(12) United States Patent
Kiefer

(10) Patent No.: US 8,869,526 B2
(45) Date of Patent: Oct. 28, 2014

(54) EXHAUST-GAS TURBOCHARGER

(75) Inventor: Clement Kiefer, Basse-Ham (FR)

(73) Assignee: BorgWarner Inc., Auburn Hills, MI (US)

( * ) Notice: Subject to any disclaimer, the term of this patent is extended or adjusted under 35 U.S.C. 154(b) by 476 days.

(21) Appl. No.: 13/254,036

(22) PCT Filed: Mar. 2, 2010

(86) PCT No.: PCT/US2010/025840
§ 371 (c)(1),
(2), (4) Date: Aug. 31, 2011

(87) PCT Pub. No.: WO2010/104695
PCT Pub. Date: Sep. 16, 2010

(65) Prior Publication Data
US 2011/0318168 A1 Dec. 29, 2011

(30) Foreign Application Priority Data
Mar. 9, 2009 (DE) .......................... 10 2009 012 309

(51) Int. Cl.
F02D 23/00 (2006.01)
F16K 31/00 (2006.01)
F02B 37/18 (2006.01)
F01D 17/10 (2006.01)
F02C 6/12 (2006.01)

(52) U.S. Cl.
CPC ................. F02C 6/12 (2013.01); Y02T 10/144 (2013.01); F02B 37/186 (2013.01); F01D 17/105 (2013.01)
USPC ....................................... 60/602; 137/601.01

(58) Field of Classification Search
CPC ........ F02B 37/18; F02B 37/186; F02B 37/00; F01D 17/105; F02C 6/12; F16K 3/0254; Y02T 10/144
USPC .................. 60/602; 415/159–165; 137/601.01
IPC ............ F02D 23/00; F01D 25/24; F02B 37/12, F02B 37/16, 37/18, 39/02, 39/16
See application file for complete search history.

(56) References Cited

U.S. PATENT DOCUMENTS

2006/0289072 A1* 12/2006 McMullen et al. ...... 137/601.01

FOREIGN PATENT DOCUMENTS

| DE | 102008032928 A1 * | 1/2010 | ............. F02B 37/18 |
| DE | 102011086507 A1 * | 2/2013 | ............. F02B 37/12 |
| JP | 2008057448 A * | 3/2008 | ............. F02B 37/18 |

* cited by examiner

Primary Examiner — Thai Ba Trieu
(74) Attorney, Agent, or Firm — William G. Anderson; Stephan A. Pendorf; Patent Central LLC

(57) ABSTRACT

An exhaust-gas turbocharger (1) having a wastegate arrangement (5) in which the structural adaptability to different installation situations and the sealing action of the wastegate arrangement (5) are improved. The rotor (4) extends along a charger axis (L). The wastegate arrangement (5) has a control capsule (6), a regulating rod (7) which can be moved by the control capsule (6), a lever (8) which is connected to the regulating rod (7) by means of a guide piece (9), and a spindle shaft (10) which is connected at one end to the lever (8) and at the other end to a spindle (11) which bears a flap plate (12) for opening and closing a bypass opening (13). Here, the spindle shaft (10) is arranged substantially parallel to the charger axis (L).

9 Claims, 2 Drawing Sheets

EXHAUST-GAS TURBOCHARGER

BACKGROUND OF THE INVENTION

1. Field of the Invention

The invention relates to an exhaust-gas turbocharger in which the structural adaptability to different installation situations and the sealing action of the wastegate arrangement are improved.

2. Description of the Related Art

Known exhaust-gas turbochargers with a so-called wastegate arrangement have a flap plate which can be actuated by means of a control capsule and a lever mechanism and which regulates the throughput of a bypass opening which leads directly from the inlet region of the spiral of the turbine housing to the outlet out of the turbine. Since the spiral is heated up very intensely by the hot exhaust gases, in particular in the inlet region, sealing problems arise in the known designs on account of the thermal loadings, which sealing problems are exacerbated in that the flap plate, in the open state, is impinged on directly by the main flow of the exhaust gas discharged by the turbine wheel.

Furthermore, the spindle shaft of known exhaust-gas turbochargers with a wastegate arrangement runs perpendicular to the charger axis, such that the regulating rod together with the control capsule is aligned substantially axially with respect to the charger axis, which leads in part to space problems and therefore to problems during the installation of the exhaust-gas turbocharger.

It is therefore an object of the present invention to create an exhaust-gas turbocharger of the type specified in the preamble of claim 1 which can be better adapted to different installation situations and which enables an improvement in the sealing action of the wastegate arrangement.

BRIEF SUMMARY OF THE INVENTION

The object is achieved by arrangement of the spindle shaft parallel to the charger axis.

In particular, the arrangement of the spindle shaft parallel to the charger axis makes it possible for the regulating rod to be arranged substantially at right angles with respect to the charger axis and to thereby position the control capsule radially, which yields installation space advantages for certain installation conditions.

Furthermore, it is made possible for the bypass opening to be arranged at one end of a bypass duct whose other end is flow-connected to the spiral of the turbine housing. This results in cooling of the exhaust-gas flow impinging on the flap plate, which increases the sealing action since thermal decoupling of the flap plate is made possible at least to a certain extent by means of the bypass duct, which acts as a cooling path.

Furthermore, the provision of a line or bypass duct of the type provides greater freedom for positioning the flap, which in a particularly preferred embodiment permits an arrangement outside the exhaust-gas main flow passing from the turbine wheel, which yields a further improvement of the sealing action of the flap plate.

Furthermore, it is made possible for the turbine housing to be formed as a sheet-metal housing, which above all yields production advantages and therefore cost advantages.

BRIEF DESCRIPTION OF THE SEVERAL VIEWS OF THE DRAWINGS

Further details, advantages and features of the present invention will emerge from the following description of exemplary embodiments on the basis of the appended drawing, in which.

DETAILED DESCRIPTION OF THE INVENTION

Figure 1:
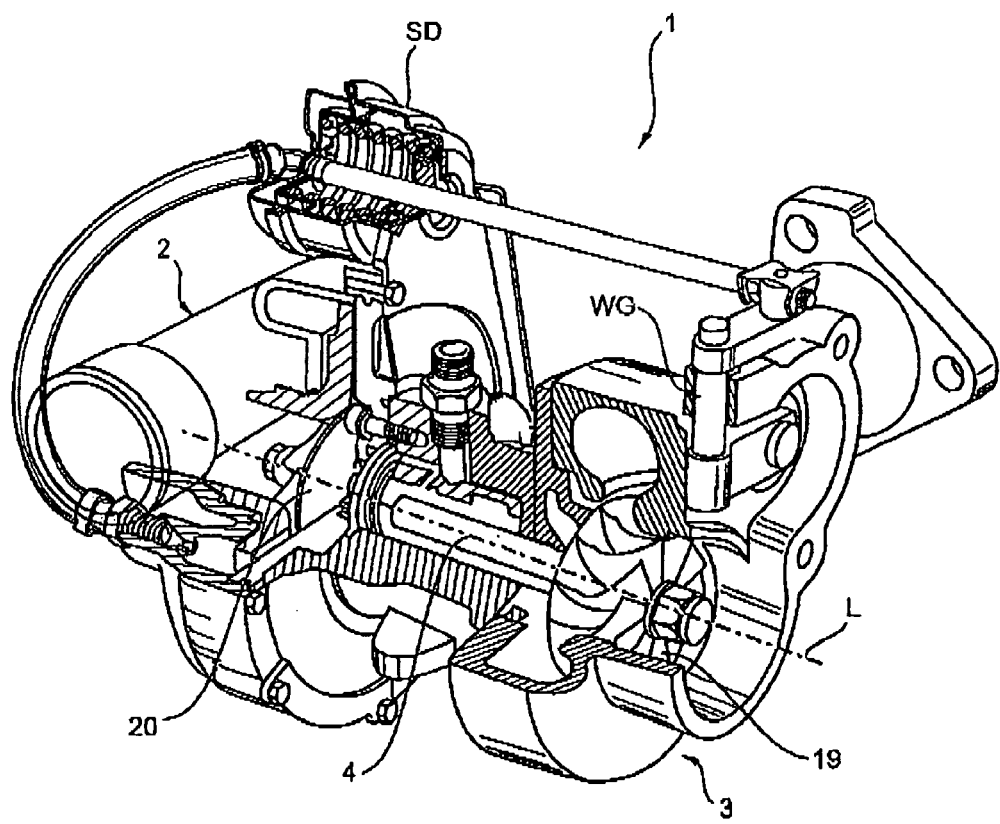
FIG. 1 shows a perspective, cut-away illustration of an exhaust-gas turbocharger having a known wastegate arrangement.

FIG. 1 illustrates an exhaust-gas turbocharger 1 which comprises a compressor 2 and a turbine 3 which are connected to one another in the usual way by means of a shaft 4. As shown in FIG. 1, the shaft 4 extends along the charger axis L and, at its ends, bears a turbine wheel 19 and a compressor wheel 20 in the usual way. The exhaust-gas turbocharger 1 is provided with a known wastegate arrangement WG with a control capsule SD. In the exhaust-gas turbocharger 1 according to the invention with its basic components as explained above, the known wastegate arrangement WG is replaced by a wastegate arrangement 5 according to the invention, which will be described in detail below.

A description of all other components, which of course likewise encompasses the said exhaust-gas turbocharger 1, may however be omitted for the explanation of the principles of the present invention.

The exhaust-gas turbocharger 1 according to the invention is therefore explained in detail below on the basis of a description of a juxtaposition of FIGS. 2-4.

The wastegate arrangement 5 comprises a control capsule 6, a regulating rod 7 which can be moved by the control capsule 6, a lever 8 which is connected to the regulating rod 7 by means of a guide piece 9, and a spindle shaft 10.

The spindle shaft 10 is connected at one end to the lever 8 and at the other end to a spindle 11 which bears a flap plate 12 for opening and closing a bypass opening 13.

Figure 3:
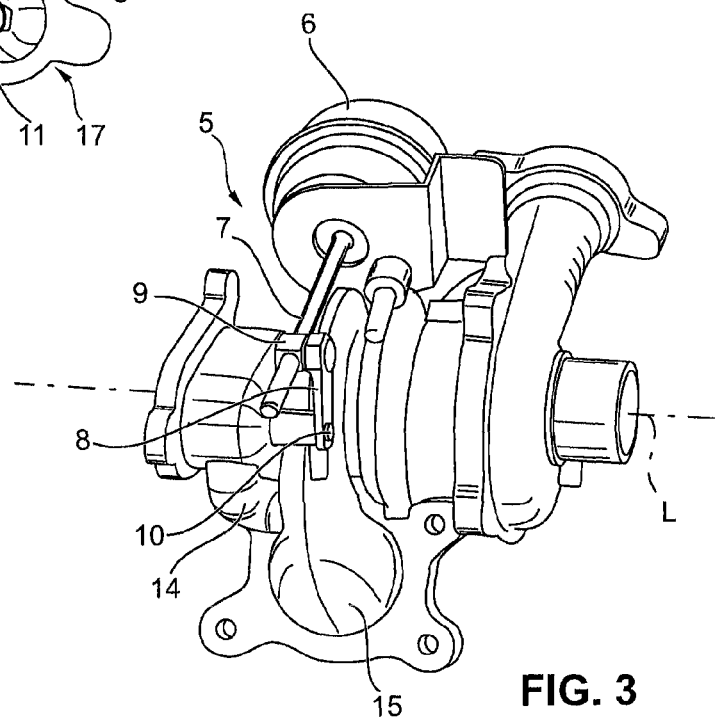

As can be seen in particular from FIG. 3, the spindle shaft 10 is arranged substantially parallel, and preferably exactly parallel, to the charger axis L.

Furthermore, the regulating rod 7 is arranged substantially at right angles to the charger axis L, as can be seen from FIG. 3.

Figure 2:
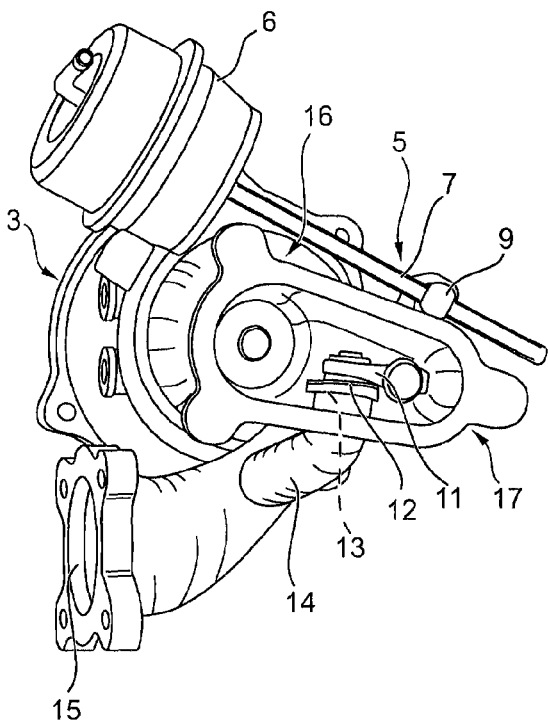
FIGS. 2-4 show detail illustrations of the wastegate arrangement according to the invention in different views of the exhaust-gas turbocharger.

As is also illustrated in detail in FIG. 2, the bypass opening 13 is arranged at one end of a bypass duct 14 whose other end is flow-connected to the spiral 15 of the turbine housing 16.

Figure 4:
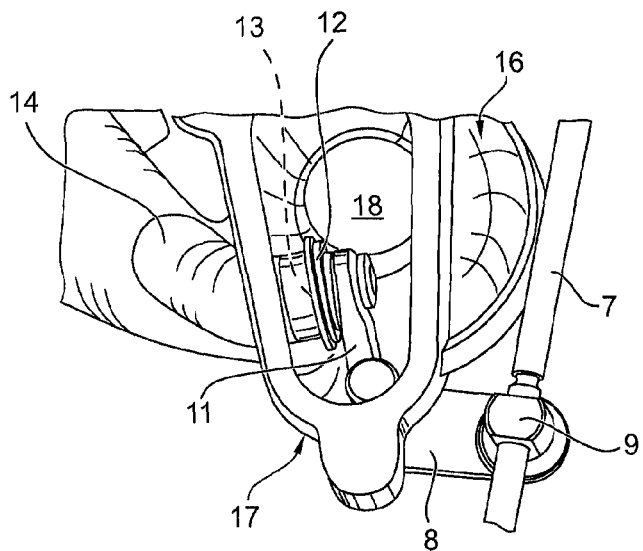

As illustrated in FIG. 4, the bypass duct 14 opens with its bypass opening 13 into an elongate housing-side flange 17 outside a region of an outlet opening 18 of the main exhaust-gas flow of the turbine housing 16.

In addition to the above written disclosure of the invention, reference is hereby additionally explicitly made to the diagrammatic illustration thereof in FIGS. 1 to 4.

LIST OF REFERENCE SYMBOLS

1 Exhaust-gas turbocharger
2 Compressor
3 Turbine
4 Shaft
5 Wastegate arrangement
6 Control capsule
7 Regulating rod
8 Lever
9 Guide piece
10 Spindle shaft
11 Spindle
12 Flap plate
13 Bypass opening 14 Bypass duct
15 Spiral
16 Turbine housing
17 Flange
18 Outlet opening
WG Wastegate arrangement according to the prior art
SD Control capsule according to the prior art

The invention claimed is:

1. A wastegate arrangement (5) of an exhaust-gas turbocharger:
   having a compressor (2);
   having a turbine (3) which has a turbine housing (16) with a spiral (15) and which is connected to the compressor (2) by means of a shaft (4) which extends along a charger axis (L);
   wherein the wastegate arrangement (5) has the following components:
   a control capsule (6),
   a regulating rod (7) moveable by the control capsule (6),
   a lever (8) which is connected to the regulating rod (7) by means of a guide piece (9),
   a spindle shaft (10) mounted rotatable relative to the turbine housing, which is rigidly connected at one end to the lever (8) and rigidly connected at the other end to a first end of a spindle (11) having first and second ends, which spindle (11) bears a flap plate (12) on its second end for opening and closing a bypass opening (13),
   wherein
   the spindle shaft (10) is arranged substantially parallel to the charger axis (L).

2. The wastegate arrangement (5) as claimed in claim 1, wherein the regulating rod (7) is arranged substantially at right angles to the charger axis (L).

3. The wastegate arrangement (5) as claimed in claim 1, wherein the bypass opening (13) is arranged at one end of a bypass duct (14) whose other end is flow-connected to the spiral (15) of the turbine housing (16).

4. The wastegate arrangement (5) as claimed in claim 3, wherein the bypass duct (14) opens with its bypass opening (13) into an elongate housing-side flange (17) outside a region of an outlet opening (18) of the turbine housing (16).

5. An exhaust-gas turbocharger (1)
   having a compressor (2);
   having a turbine (3) which has a turbine housing (16) with a spiral (15) and which is connected to the compressor (2) by means of a shaft (4) which extends along a charger axis (L);
   having a wastegate arrangement (5) of the turbine (3), which wastegate arrangement (5) has the following components:
   a control capsule (6),
   a regulating rod (7) moveable by the control capsule (6),
   a lever (8) which is connected to the regulating rod (7) by means of a guide piece (9),
   a spindle shaft (10) mounted rotatable relative to the turbine housing, which is rigidly connected at one end to the lever (8) and rigidly connected at the other end to a first end of a spindle (11) having first and second ends, which spindle (11) bears a flap plate (12) on its second end for opening and closing a bypass opening (13),
   wherein
   the spindle shaft (10) is arranged substantially parallel to the charger axis (L).

6. The exhaust-gas turbocharger (1) as claimed in claim 5, wherein the regulating rod (7) is arranged substantially at right angles to the charger axis (L).

7. The exhaust-gas turbocharger (1) as claimed in claim 5, wherein the bypass opening (13) is arranged at one end of a bypass duct (14) whose other end is flow-connected to the spiral (15) of the turbine housing (16).

8. The exhaust-gas turbocharger (1) as claimed in claim 7, wherein the bypass duct (14) opens with its bypass opening (13) into an elongate housing-side flange (17) outside a region of an outlet opening (18) of the turbine housing (16).

9. The exhaust-gas turbocharger (1) as claimed in claim 5, wherein the turbine housing (16) and the bypass duct (14) are formed as sheet-metal parts.

* * * * *